United States Patent [19]

Stoddard

[11] Patent Number: 4,463,966
[45] Date of Patent: Aug. 7, 1984

[54] TRAILER TOWING AND STEERING SYSTEM

[76] Inventor: Ronald L. Stoddard, Rte. 1, Box 80, Hershey, Nebr. 69143

[21] Appl. No.: 347,876

[22] Filed: Feb. 11, 1982

[51] Int. Cl.³ ..................... B62D 13/02; D62D 13/04
[52] U.S. Cl. .................................... 280/442; 280/443
[58] Field of Search ............... 280/442, 443, 444, 445, 280/426, 419, 98, 99, 100, 101, 102, 103

[56] References Cited

U.S. PATENT DOCUMENTS

| 2,819,911 | 1/1958 | Ranta | 280/426 |
| 4,212,483 | 7/1980 | Howard | 280/444 |
| 4,223,908 | 9/1980 | Poliker et al. | 280/419 |

FOREIGN PATENT DOCUMENTS

| 959973 | 3/1957 | Fed. Rep. of Germany | 280/426 |
| 2116077 | 10/1972 | Fed. Rep. of Germany | 280/442 |
| 2646801 | 4/1978 | Fed. Rep. of Germany | 280/442 |
| 450932 | 5/1968 | Switzerland | 280/442 |

Primary Examiner—John A. Pekar
Attorney, Agent, or Firm—Hiram A. Sturges

[57] ABSTRACT

A trailer steering hitch system for towing and trailer vehicles in which a tongue extends between the vehicles and in which a cable system extends along the tongue from a stationary elliptical pulley disposed beneath the towing vehicle to a rotating elliptical pulley beneath the trailer, the trailer having the wheels of its forward wheel system mounted for turning in accordance with the rotational position of the trailer elliptical pulley, the tongue being attached to the trailer in a manner for extending straight-forwardly therefrom at all times, inclination of the truck with respect to the tongue as the truck turns causing a cable movement bringing corresponding rotation of the trailer elliptical pulley for turning the wheels of the forward trailer wheel system toward that side of the trailer in which the towing vehicle is turning.

4 Claims, 13 Drawing Figures

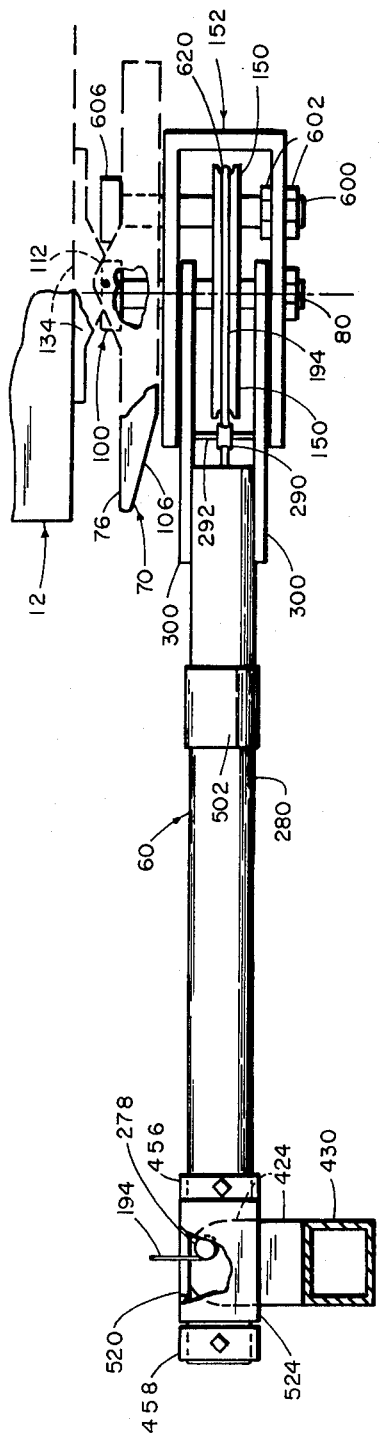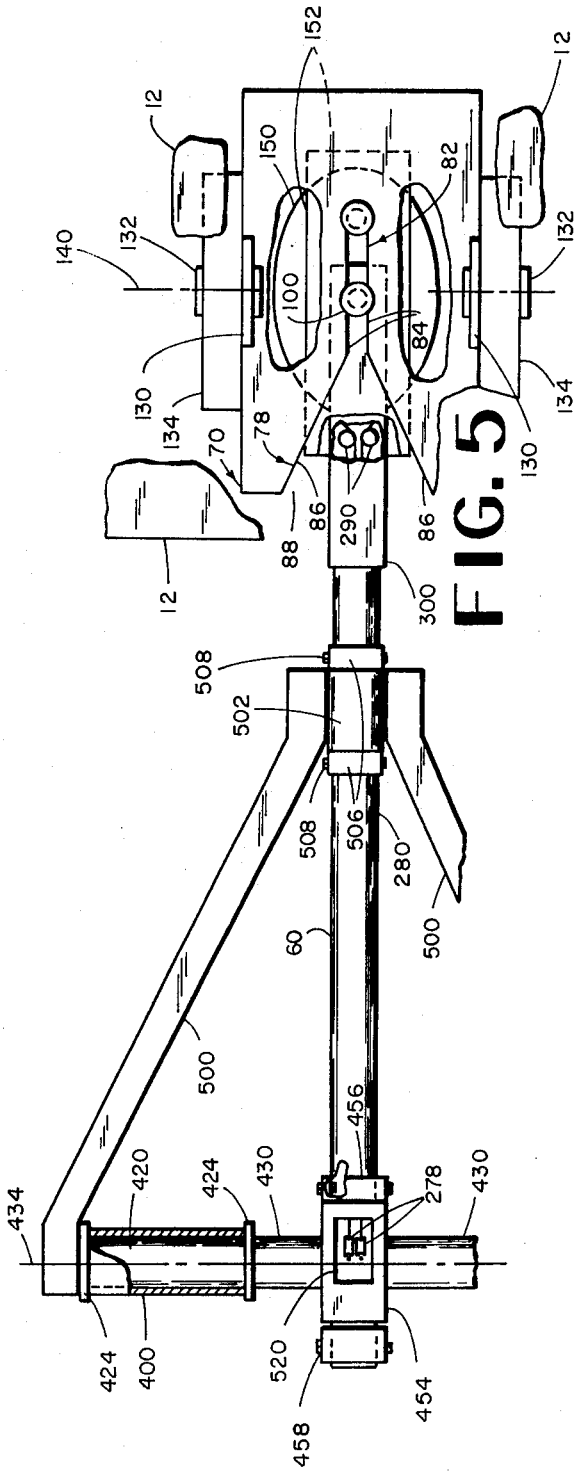

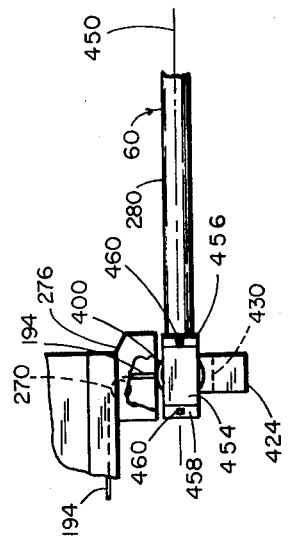
FIG. 7
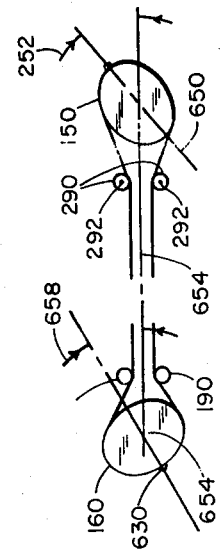
FIG. 9
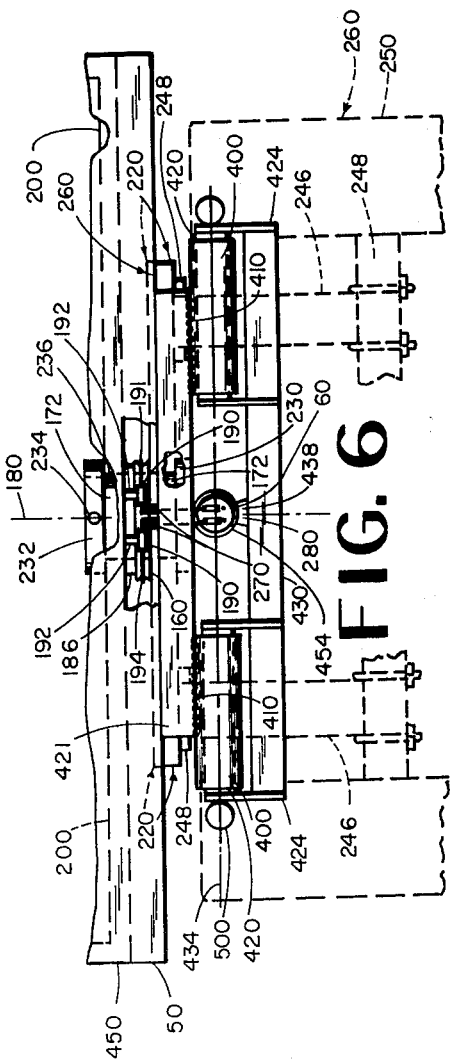
FIG. 6
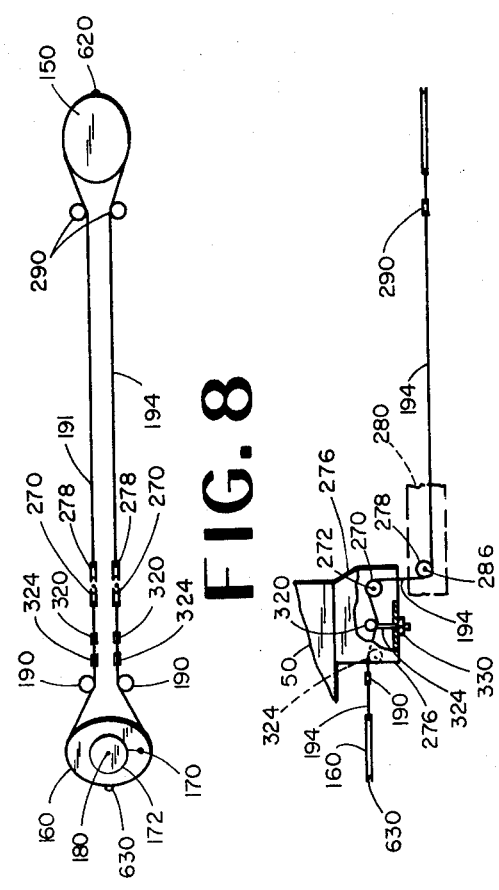
FIG. 8
FIG. 10

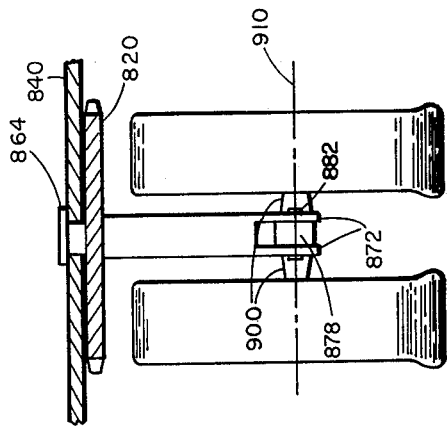
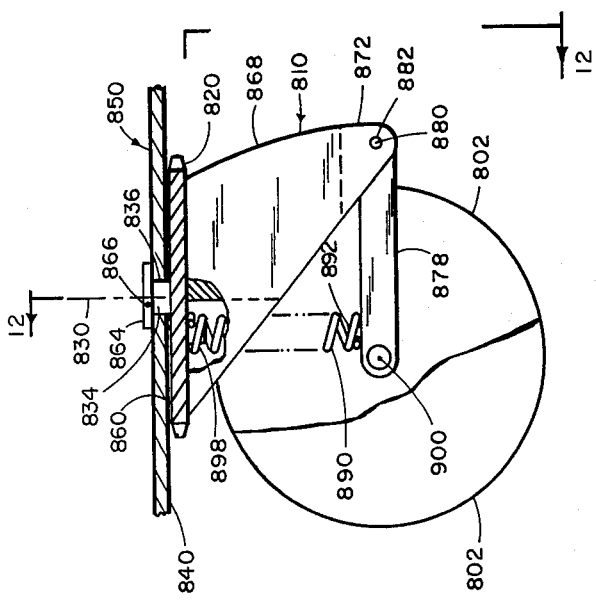
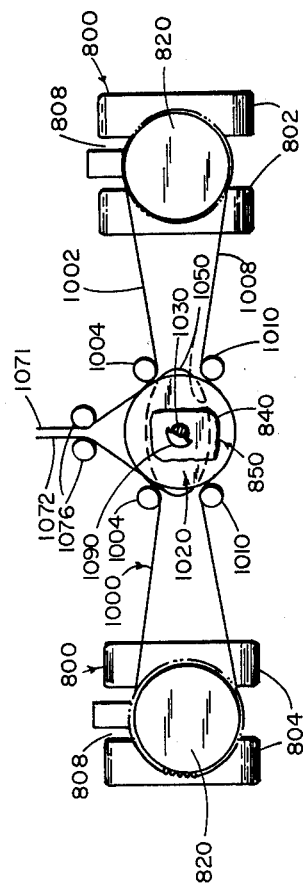

TRAILER TOWING AND STEERING SYSTEM

BACKGROUND OF THE INVENTION

One objective of this invention is improved ease of hitching over ball hitches which must be lined up both horizontally and vertically to hitch the same with the old army type pendulum hitch.

The hitch hereof is very similar to a semi-trucktrailer fifth wheel which, when lined up vertically, needs only an approximate horizontal line-up. The "fifth wheel type" hitch hereof is unique in that it has a double pin which slides into the inverted "fifth wheel" which is located under the truck frame (instead of on top of the truck frame). Instead of the rear of the fifth wheel tipping down, the rear of the inverted fifth wheel tips up when unhitched. When the double pin of the trailer tongue is locked into the inverted fifth wheel, the hitching of the elliptical steering pulley system which steers the fron wheel assembly of the trailer is placed in operation.

Improved backability of the trailer is another advantage. The center of the rearwardmost wheel-assembly, or wheel-truck of the trailer is a pivot point during backing up.

The forward wheel assembly of the trailer is steered by the angle of the vehicle backing it. This lets the trailer back up as though it were a two-wheeled trailer.

Another objective is to provide a truck and trailer assembly which is more safe from jack-knifing and is more stable on all road conditions by having a large truck ahead of the loaded trailer, instead of a small tractor with a semi-trailer on it. There is then more control on the truck pulling the trailer which allows the handling of the trailer without as much of a problem of jack-knifing. The trailer also will steer the front wheels in small amounts, depending upon how much of jack-knife one is sliding into.

For example, when the rear end of the truck starts to slide to the left in the beginning of a jack-knifing, then the front wheels of the trailer will turn to the right at their forward ends as a result of the effect of the two elliptical pulleys of this invention, whereby the trailer wheels are then in a better angular position for resisting further jack-knifing. They are then in a position more transverse to the direction of a jack-knifing motion and less in alignment with such direction. By keeping the driver in control of the truck's steerability, the result is much lesser jack-knifing and safer public highway conditions.

The truck and trailer assembly hereof can be loaded by just dropping a ramp across between the trailer and truck. By just unhitching the trailer, one can back the truck up against the trailer while the trailer is backed up to a dock, allowing one to load the truck and trailer at one stop by having doors in both ends of the trailer and a door in the back of the truck, also the trailer can be left to be loaded in another location from the truck, and then the truck can be rehitched to the trailer.

An objective is to provide a hitch and steering system that could be used on many types of trailers, from camping trailers which are pulled either by some automobiles and pickups up to large stock trailers and horse trailers, and sizes all the way up to big commercial hauling trailers, such as grain trailers, livestock trailers, merchandise trailers and tank trailers.

An objective is to provide interchangeability of a trailer from one truck to another. This is possible, even through ellipses that are more circular will be used on trailers having front axles closer to their forward ends and is made possible because the entire elliptical pulley pulling assembly is mounted on trailer and tongue with nothing but uniform inverted "fifth wheels" mounted on the trucks.

An important feature is that the fifth wheel hereof is inverted as compared with prior art use in truck-to-trailer hitching.

SUMMARY OF THE INVENTION

The major goal of this application is to provide a trailer steering hitch system for towing and trailer vehicles and in which a cable system extends along the tongue from a stationary elliptical pulley beneath the towing vehicle to a rotating elliptical pulley beneath the trailer, the trailer having the wheels of its forward wheel system mounted for turning in accordance with the position of the trailer elliptical pulley, the tongue being attached to the trailer in a manner for extending straight-forwardly therefrom at all times, inclination of the truck with respect to the tongue as the truck turns causing a cable movement bringing corresponding rotation of the trailer elliptical pulley for turning the forward trailer wheels toward that side of the trailer on which the towing vehicle is turning.

BRIEF DESCRIPTION OF THE DRAWINGS

FIG. 4 is a detail in side elevation showing a truck partially in full and partially in dotted lines with the hitching system of this invention connected thereto and shown partially in full and partially in dotted lines, parts of the hitching system being broken away revealing other parts which are sometimes shown in cross-section. The outermost or rightmost half of the right side of the hitching system is not shown in FIG. 4, but is broken away.

FIG. 5 is a top plan view of the parts shown in FIG. 4, with the exception that the fifth wheel or pivot pin receiver and the truck attached thereto are not shown, and the bracket which is to support the pulley alignment pin is shown in dotted lines in FIg. 5.

FIG. 6 is a front view of the hinge assembly which attaches the hitch to the trailer. FIg. 6 is a sectional view taken along the line 6—6 of FIG. 1, but not showing the upper portion of the trailer and not showing the lower parts of the wheels.

FIG. 7 shows a rearward portion of the tongue assembly as it would be seen in FIG. 1 with portions thereof broken away.

FIG. 8 is a diagrammatic view showing the ellipse and cable system in positions for straight forward travel.

FIG. 9 shows the diagrammatic view of the ellipse and cable system with the ellipses in position assumed when the truck is turned 45° to the left. FIG. 9 is a top plan view.

FIG. 10 is a diagrammatic showing of the ellipse and cable system of FIG. 8, but with certain parts of the trailer shown in place, partially in full and partially in dotted lines.

FIG. 11 is a view of the left wheel assembly of FIG. 13 with the inner half of the left wheel assembly outer control gear being broken away and only a small part of the trailer floor being shown in cross-section.

FIG. 12 is a sectional view taken along the line 12—12 of FIG. 11, and showing an outer wheel control pulley in full lines, but in cross-section.

FIG. 13 is of a second modification of a trailer forward wheel system, this system being of a caster type, and showing thereon the pulley system which cooperates with the elliptical pulley system for steering the front wheels; all but a small portion of the trailer being broken away.

DESCRIPTION OF THE PREFERRED EMBODIMENTS

Figure 1:
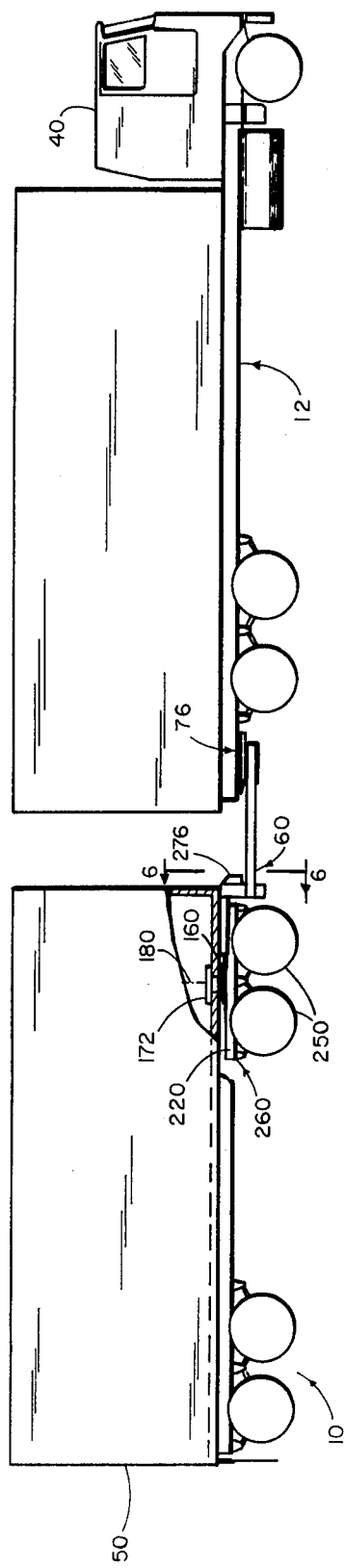
FIG. 1 is a side elevation of a truck pulling a trailer of this invention with the hitch of this invention.
Figure 3:
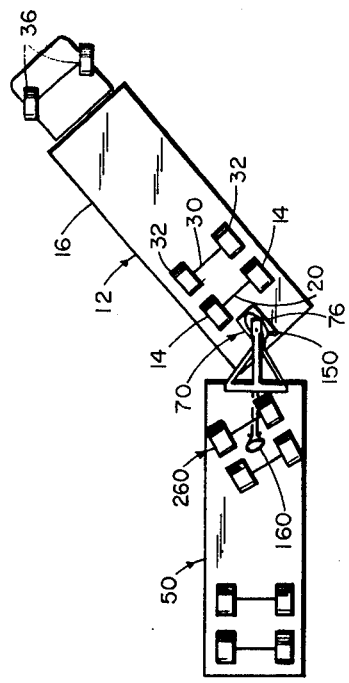
FIG. 3 is a view similar to FIG. 2 but showing the truck in a position of backing up and showing how the forward wheels of the trailer assume an angle complimentary to the direction of motion of the trailer forward end during backing up at such a stage.

The trailer towing and steering system of this invention is generally indicated at 10 in FIG. 1 and comprises a towing vehicle generally indicated at 12 having right and left rearmost wheels 14 and the rear end of the chassis 16 can be supported by the two rearmost wheels 14 on a single axle 20, as seen in FIG. 3, or at the positions 14, there can be dual right and dual left wheels respectively.

In addition, the rearward end of the chassis 16 can be supported by wheels and an extra axle 30, and such extra wheels are seen at 32. Where two axles 20 and 30 are used, these are commonly called "tandem" axles.

Thw vehicle 12 has forward wheels 36 which are steered in the usual front steering manner by a driver of the towing vehicle 12 who would be inside a cab 40 if the towing vehicle is a truck, as illustrated.

The trailer 50 is disposed behind the truck or towing vehicle 12.

A tongue extends between the towing vehicle 12 and the trailer or towed vehicle 50. A hitch assembly 70 connects the forward end of the tongue 60 to the towing vehicle or truck 12, the hitching system 70 being best seen in FIG. 4 and comprising later described fifthwheel 76 suspended beneath the truck 12 in a position closely spaced rearwardly of the rearmost wheels 14 thereof, as best seen in FIG. 3.

The fifth wheel 76 has a forwardly and inwardly constricting notch 78 in its rearward end for guiding the upper end of the hitch pin into a very restricted forwardmost portion 82 of the notch 78, the forwardmost portion 82 being also describable as a slot, since it has parallel walls 84 on its right and left sides, each of which join an inclined wall surface 86 of a guiding or rearward portion 88 of the notch 78.

The purpose of the inverted fifth wheel 76 is so that when the truck is backed up toward the tongue 60, as best visualized in FIGS. 4 and 5, the rearward section of the inverted fifth wheel 76 will guide the inverted fifth wheel 76 with respect to the hitch pins 80 and 600, so that the guiding surfaces 86 guide the hitch pin into the restricted slot 84 where it remains during towing.

Any conventional means of locking the hitch pins in the slot 82 can be used and such means are well-known, being seen in the common connections of the forward ends of semi-trailers to the fifth wheels of trucks. However, to illustrate a sample of one way to make this locking, as is illustrated for example only and not recommended for use, a locking bar can be caused to extend from left to right, as seen at 100, across the rearward side of the upper end of the hitch pin 80. The locking bar 100 being firmly held in holders 102 at its ends which are mounted on the underside of the fifth wheel 76. By sliding the locking bar 100 out of place, the pin 80 is then released so that the driving away of the truck will release the tongue 60.

The underside of the end of the fifth wheel 76 is upwardly and rearwardly inclined on surfaces 106 thereof, as seen in FIG. 4, so as to guide the end of tongue 152 down under inverted fifth wheel 76. The heads 112 and 606 are of larger size than the slot 82 for upwardly supporting the hitch pins 80 and 600 and the tongue.

The fifth wheel 76 has mounted thereon two upwardly extending wheel ears 130 which are pivotally fixed by pins 132 to trunions 134 which are best seen in FIG. 4 to be attached at their upper sides suitably to the underside of the rearward end of the truck 12 so that the pins 132 provide a horizontal fifth wheel pivot axis 140 extending from right to left of the truck 12 in the usual manner.

A stationary forward elliptical pulley or holder 150 is disposed beneath the towing vehicle 12 at its rearward end and the forward elliptical pulley mounting system, generally indicated at 152, the purpose of the system 152 being for maintaining the forward elliptical pulley 150 in a stationary position with respect to the towing vehicle 12, as later described.

A rotating rearward elliptical pulley or holder 160 is best seen in FIG. 3 to be disposed beneath the trailer 50. A rearward elliptical pulley mounting system is generally indicated at 170 in FIG. 8 and comprises a rearward elliptical pulley pivot pin 172 which mounts the rearward elliptical pulley 160 for rotation in a horizontal plane about the vertical trailer elliptical pulley and wheel truck turning axis 180, best seen in FIG. 6. The pin 172 is fixed to the upper side of the elliptical pulley 160 and the pin 172 extends through very strong support structure 186 mounted on the lower side of the forward end of the trailer. In FIG. 6 certain rearward ellipse cable guide pulleys are shown at 190 in front of the rearward ellipse or rearward elliptical pulley 160 for causing a cable segment 191 on the left side of the trailer 50 and a cable segment 194 on the right side of the trailer 50 to be guided upon and tightly held against the rearward elliptical pulley 160, as best seen in FIG. 8.

In FIG. 6, the pulleys 190 can be seen to be mounted on axles 192 which are fixed to the underside of the trailer 50.

The trailer 50 has a floor 200 seen partially in full lines in FIG. 6 and partially in dotted lines, and it is on the under side of the floor structure 200 that the metal plate 186 is disposed through which the pin 172 extends.

Figure 2:
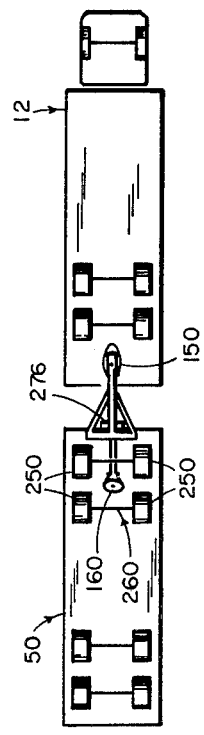
FIG. 2 is a bottom plan view of the elements of FIG. 1 showing the trailer and truck in alignment.

As thus described, the elliptical pulley 160 of the trailer rotates freely about the rear ellipse axis 180 and the trailer 50 also has a forward wheel truck or forward wheel carrier 220, best seen in FIG. 6 and also shown in FIG. 2A, the carrier 220 being free to rotate in a horizontal plane about the axis 180 and being carried by the pivot pin 172 for rotation since the pin 170 extends vertically through the wheel carrier 220.

The pivot pin 172 can best be seen in FIG. 6 to have a flange 230 at its lower end so as to retain the wheel carrier 220 thereon. The upper end of the pivot pin 172 is secured by a strong collar 232 held by a securing pin 234. The collar 232 is above the floor 200 and of larger size than a pivot pin opening 236 through the floor 200 and through which the pin 172 rotatably extends. The wheel carrier 220 has an upper rotating platform 242 down from which suitable springs 246 extend, the latter being attached to forward wheel axies 248, seen in dotted lines in FIG. 6, in a conventional manner, the axles carrying forward wheels 250, whereby the wheels 250, the carrier 220, with its platform 242 and the springs 246 which are mounted on the underside of the platform 242 and suitable conventional shackles 248, as seen in FIG. 6, can all be called a forward wheel system 260, rotatable in a horizontal plane about the pivot axis 180 and rotating at all times in a fixed relationship to the rotating rearward ellipse pulley 160. Cables 191 and 194 can be seen in FIGS. 8 and 10 to extend forwardly from the ellipse pulley 160 around the inner sides of the pulleys 190, then forwardly to pulleys 270 which rotate on horizontal axles 272 suitably fixed to the trailer 50 by means of a pulley-carrying frame 276 attached to the underside of the forward end of the trailer 50.

The frame 276 is seen in FIG. 10 in greater detail as visible in FIG. 1, but is not seen in FIG. 6 because it would obscure important parts there. The frame 276 is located only in the center from right to left of the trailer and can be seen at 276 in FIG. 2.

Referring to FIG. 10, the cables 191 and 194 extend downwardly from the pulleys 270 and under pulleys 278 disposed inside the rearward portion of the hollow central part 280 of the tongue 60, as best seen in FIG. 7 and also in FIGS. 4 and 5. In the rearward end of the hollow part 280 of the tongue are pulleys 278, rotating about horizontal axles 286 fixed to the tongue part 280, whereby the cables 191 and 194 extend forwardly through the tongue part 280 and around the inner sides of forward side pulleys 290, seen in FIG. 4, and rotating about vertical axles 292 suitably mounted on the tongue 60 and specifically to upper and lower flat forwardly extending projections 300 fixed to the top and bottom of the central part 280 of the tongue.

Referring now to FIG. 10, right and left tensioning hold-down pulleys 320 are on the upper sides of respective cable 191 and 194, although only one is shown in FIG. 10, both being shown in FIG. 8. The pulleys 320 are mounted on bolts 324 which can be drawn downwardly by nuts 330 on the underside of the pulley frame 276 through which the bolts 324 extend, so as to maintain the cables 191 and 194 in a taut condition at all times between pulleys 272 and two support pulleys 324 disposed one under each cable 191 and 194 and rotating on the frame 276.

Referring again to FIG. 6, a pair of horizontally extending mountings 400 can be seen to be welded at 410 to the underside of the mounting support 421, which is itself fixed to the forward end of the trailer 50 and on its underside. The mountings 400 are each cylindrical on their interiors and rotatably receive therein horizontally extending tongue-shafts 420 downwardly from which tongue-suspending members 424 extend so as to support a transverse member 430 of the rearward end of the tongue 60 in a manner whereby the transverse tongue member 430 is free to swing about a horizontal tongue axis 434, seen in FIG. 6, extending through the centers of the mountings 400 and extending from right to left of the trailers 50 at a right angle to the line of draft of the body portion 450 of the trailer, as distinguished from the front wheel system 260 which rotates with respect thereto.

As best seen in FIG. 6, the central pipe or central part 280 of the tongue 60 is disposed upwardly from the transverse member 424. The central part 280 is fixed to the transverse member 430 by a suitable connector 438, seen in FIG. 6. The central part 280 is on the same vertical height level with the axis 434, as best seen in FIG. 6.

The central part 280 must be free to twist about a horizontal axis 450, best seen in FIG. 7, and this is accomplished by allowing the part 280 to extend through a sleeve 454, best seen in FIG. 7, and which appears in FIGS. 4, 5 and 6. The sleeve 454 fits around the central tongue part 280 and receives it rotatably therein, although the central tongue part 280 cannot move forwardly and rearwardly with respect to the sleeve 454 because of the forward and rearward collars 456 and 458, which are bolted to the central part 280 by bolts 460.

The tongue central part 280 is braced, as best seen in FIG. 5, by right and left braces 500 which are attached to a brace collar 502 at their forward ends, the latter being rotatably received about the central part 280 of the tongue and held from moving forwardly and rearwardly along the central part 280 by brace collars 506 bolted by bolts 508 to the central part 280.

Each brace 500 extends rearwardly and outwardly and is attached at its rearward end to the outermost suspension members 424, as best seen in FIG. 5.

As best seen in FIG. 5, the member 454 has a cable opening 520 in the upper side thereof through which the cables extend.

When the truck or towing vehicle 12 is moved rearwardly toward the trailer 50 so that the fifth wheel plate 76 is caused to receive in its notch 88 the ellipse holder pin 600, which is directly forwardly of the hitch pin 80, then the hitch pin 80 will simultaneously be received in the notch 88, and the pins will be guided by the inclined walls 86 in a conventional manner forwardly into the forward restricted slot portion 84. Thereafter, the locking bar 100 is inserted through the locking bar holders 102 by sliding it horizontally in behind the head 112 of the hitch pin 80. The locking bar 100 can be removably held in place by means not shown.

Thereafter, the hitch is completely secured and the truck can drive away, pulling the trailer.

The ellipse holder pin 600 extends through the forward elliptical pulley mounting system 152 and can be held by bolts 602, seen in FIG. 4, to the system 152 so as to maintain the upper end of the forward ellipse pulley locking bolt 600 protruding upwardly enough so that its head 606 is received above the fifth wheel 76.

Since the forward elliptical pulley 150 cannot rotate and since the cable segments 191 and 194 are fixed to the forward end of the forward elliptical pulley 150 by suitable means, shown at 620 in FIG. 4, and at 620 in FIG. 8, the cable segments 191 and 194 will be respectively pulled as the truck turns.

The rearward ends of the cables 191 and 194 are fixed to the rearward elliptical pulley 160 at its rearward side by suitable means diagrammatically shown at 630 in FIG. 8 and also seen in FIG. 9.

As a result, when the truck is turned at a 45 degree position, such as shown in FIG. 3, then the forward ellipse will have its long axis 650 of FIG. 9 parallel with the length of the truck 12 and at a 45 degree angle 652 with respect to the line 654 which is projected straight forwardly from the center line of the trailer 50, extending through the center from forward to rearward ends. The line 654 is also a line which would represent the previous position of the truck longitudinal center line before turning had begun.

From this is can be seen that whatever angle 652 the truck has turned through, the rearward ellipse 160 will have rotated a corresponding same angle shown by the number 658 in FIG. 9, and the forward wheel system 260 of the trailer will have assumed the position shown in FIG. 3. This latter would be true, whether the truck had achieved its 45 degree position by turning while going forward, or turning while backing up. The position of the forward wheels 36 of the truck 12 of FIG. 3 show positions of the forward wheels when the truck is backing up. However, it must be realized that the truck and the trailer are in the relative positions with respect to each other correctly in FIG. 3, but are not to be considered in correct position relative to FIG. 2, because the trailer will have also moved as the truck is backing up.

In FIG. 13, a modified form of wheel system is generally indicated at 800, and comprises two right wheels 802 and two left wheels 804. The pair of right wheels 802 are separated by a space 808, as is the case also with the left wheels 804, and in that space a wheel suspension system, generally indicated at 810 in FIG. 11, is disposed, and each suspension 810 has at its upper end a driven gear 820 of circular shape which rotates in a horizontal plane about an axis 830, as seen in FIGS. 11 and 12, the gear 820 being carried on a mounting pin 834 which extends upwardly through an opening 836 in the bottom of the trailer, the trailer bottom being generally indicated at 840 and the trailer itself in this modification not being shown other than the forward part of its floor seen at 840, the trailer itself being given the general number 850.

The floor 840 is diagrammatically shown in FIG. 11, and would actually be of a thicker and stronger looking structure in practice, perhaps, but it is sufficient to illustrate it in this manner, since the important thing is that the gear 820 be free to rotate, such as by having grease 860 on its upper surface and between it and the floor 840. The gear 820 only rotates in small proportions and only during on going in and out of turns.

The upper end of the pin 834 is held to the floor by a collar 864 bolted at 866 to the pin 834.

Downwardly from the gear 820 and firmly secured thereto, extends a hollow wheel carrier 868 which is provided at its lower end with spaced right and left side portions 872 between which a wheel support arm 878 is carried,. The arm 878 pivots about a horizontal pivot axis 880 which extends from right to left at times when the trailer 850 is moving forwardly. A bolt 882 extends along the axis 880 securing the forward end of the arm 878 to the lower ends of the side portions 872, whereby the arm 878 is free to swing upwardly and downwardly about its rearward end and is urged downwardly to a desired extent by a compression spring 890 disposed around a lower holder 892 attached to the upper side of the rearward end of the arm 878 and also suitably fixed to the spring 890.

Similar attaching member 898 attaches the upper end of the spring 890 to the underside of the gear 820 at a point substantially rearward of the axis 830, preferably, and at least it is important that the spring 890 engage the arm 878 rearwardly of the axis 880 and at the rearward end of the arm 878 is an axle 900 fixed to the arm 878 and rotatably supporting at its right and left sides the wheels 802, although FIG. 11 also describes a left wheel assembly 800.

The wheel 802, therefore, rotates on the axle 900 about a rotational axis 910.

In FIG. 13, it will be seen that an endless chain 1000 extends around the gears 820 of the left and right forward assemblies 800 and also the chain 1000 has a forward segment 1002 which passes under two idler pulleys 1004, called forward idler pulleys.

The chain 1000 has a rearward segment 1008 which extends forwardly of two rearward idler pulleys 1010. The pulleys 1004 and 1010 are each a pair of pulleys disposed one on the right and one on the left of the driving gear 1020 at the center from right to left under the trailer 850, the gear being carried on a gear pin 1030, which latter is extended from the gear 1020 which is below the floor 840 of the trailer upwardly through the floor 840 of the trailer. The chassis of the trailer is not shown in FIG. 13, except for a small part of the forward part of the floor 840, and so the numeral 850 for the trailer is indicated toward the floor portion shown at 840 in FIG. 13. However, the gear 1020 would be greased on its upper side and be a very strong gear with its upper side bearing against the underside of the floor structure 840 of FIG. 13.

Beneath the gear 1020, and also on the same shaft 1030 is a rearward elliptical pulley 1050 which is of a shape and function identical to the pulley 160 of FIG. 8, and earlier desribed, whereby with the pulley 1050 fixed to the same shaft 1030 which the drive gear 120 is attached to, the elliptical pulley system will, therefore, cause a rotation of the right and left wheel systems 800 for causing the wheels to assume the same angle in proportion to the angular position of a truck with respect to a trailer that are assumed by the wheels of the forward wheel suspension system 260 of FIG. 3 when its truck is at the same angle with respect to the trailer. For that reason, further description of operation is believed unnecessary.

Right and left cable segments 1071 and 1072 extend from the pulley 1050 forwardly on the inner side of two directing idler pulleys 1076 and from there extend forwardly in the same manner as the cable segments 194 and 191 of FIG. 8.

In FIG. 13, at the upper end of the pin or shaft 1030 is a collar 1090 fixed thereto, but only a part of the collar is shown, the collar 1090 serving the same purpose as the collar 864 of FIG. 11.

I claim:

1. A trailer towing and steering system comprising: a towing vehicle having right and left rearmost wheels, a trailer spaced behind said towing vehicle, a tongue extending between said vehicles, hitch means connecting said tongue to said towing vehicle in a manner for the pivoting of said tongue about a vertical towing axis at a rearward portion of said towing vehicle and also in a manner for the pivoting of said tongue upwardly and downwardly at its forward end about a horizontal tongue-axis at its rearward end, a stationary forward elliptical holder disposed beneath said towing vehicle, means maintaining said forward elliptical holder in a stationary position with respect to said towing vehicle, a rotating rearward elliptical holder beneath said trailer, means rotatably mounting said rearward holder on said trailer for rotation about a vertical axis, said trailer having a forward wheel system and a rearward wheel system, said trailer having the wheels of its forward wheel system mounted in a manner for turning said trailer during forward or rearward movement of said trailer, said tongue being attached to said trailer in a manner for extending straight forwardly therefrom at all times, a flexible connector system extending along said tongue and interconnecting said elliptical holders whereby a turning inclination of said truck with respect to said tongue as said towing vehicle and forward elliptical holder turn causes a movement of said flexible connector system bringing corresponding rotation of said rearward elliptical holder, a motion transfer assembly having a rotating trailer member being mounted on said trailer in a manner for rotating about a certain vertical axis, said trailer forward wheel system mounting said forward wheels on said trailer in a manner permitting them to be turned at their forward sides to the right or to the left, means connecting said rotating trailer member and said rearward elliptical holder whereby when said rearward elliptical holder is rotated this causes a turning of the wheels of said trailer forward wheel system toward that side of said trailer to which said towing vehicle is turning, said means connecting said tongue to said towing vehicle comprising a fifth wheel under a rearward part of said towing vehicle and having a forwardly and inwardly tapering notch in its rearward end and extending forwardly therein, means mounting said fifth wheel on said towing vehicle, said tongue having a forward end having a hitch pivot pin attached thereto and extending vertically upward and projecting upwardly therefrom and having an enlarged upper end spaced from said tongue, said tongue pivoting about a vertical axis extending through said hitch pin, a forward elliptical holder fixing pin connected to said forward elliptical holder and projecting above said tongue and having an enlarged upper end spaced from said tongue, said fifth wheel receiving said hitch and fixing pins in said notch with the enlarged upper ends of said hitch and fixing pins disposed above and lapping said fifth wheel, means releasably locking said hitch and fixing pins into said notch.

2. The trailer towing and steering system of claim 1 in which said fifth wheel is an inverted fifth wheel having an upwardly and rearwardly inclined under surface at its rearward end to deflect said tongue downwardly during hitching.

3. A trailer towing and steering system comprising: a towing vehicle having right and left rearmost wheels, a trailer spaced behind said towing vehicle, a tongue extending between said vehicles, hitch means connecting said tongue to said towing vehicle in a manner for the pivoting of said tongue about a vertical towing akxis at a rearward portion of said towing vehicle and also in a manner for the pivoting of said tongue upwardly and downwardly at its forward end about a horizontal tongue-axis at its rearward end, a stationary forward elliptical holder disposed beneath said towing vehicle, means maintaining said forward elliptical holder in a stationary position with respect to said towing vehicle, a rotating rearward elliptical holder beneath said trailer, means rotatably mounting said rearward holder on said trailer for rotation about a vertical axis, said trailer having a forward wheel system and a rearward wheel system, said trailer having the wheels of its forward wheel system mounted in a manner for turning said trailer during forward or rearward movement of said trailer, said tongue being attached to said trailer in a manner for extending straight forwardly therefrom at all times, a flexible connector system extending along said tongue and interconnecting said elliptical holders whereby a turning inclination of said truck with respect to said tongue as said towing vehicle and forward elliptical holder turn causes a movement of said flexible connector system bringing corresponding rotation of said rearward elliptical holder, a motion transfer assembly having a rotating trailer member being mounted on said trailer in a manner for rotating about a certain vertical axis, said trailer forward wheel system mounting said forward wheels on said trailer in a manner permitting them to be turned at their forward sides to the right or to the left, means connecting said rotating trailer member and said rearward elliptical holder whereby when said rearward elliptical holder is rotated this causes a turning of the wheels of said trailer forward wheel system toward that side of said trailer to which said towing vehicle is turning, said means connecting said tongue to said towing vehicle comprising a fifth wheel under a rearward part of said towing vehicle having a forwardly and inwardly tapering notch in its rearward end and extending forwardly therein, means mounting said fifth wheel on said towing vehicle, said tongue having a forward end having a hitch pivot pin attached thereto and extending vertically upward and projecting upwardly therefrom and having an enlarged upper end spaced from said tongue, said tongue pivoting about a vertical axis through said hitch pin, said fifth wheel receiving said hitch pin in said notch with the enlarged upper ends of said hitch pin disposed above and lapping said fifth wheel, means releasably locking said hitch and fixing pins into said notch.

4. The trailer towing and steering system of claim 3 in which said fifth wheel is an inverted fifth wheel having an upwardly and rearwardly inclined under surface at its rearward end to deflect said tongue downwardly during hitching.

* * * * *